(12) United States Patent
Celik et al.

(10) Patent No.: US 12,738,401 B2
(45) Date of Patent: Sep. 15, 2026

(54) SUPPLEMENTAL COOLING SYSTEM FOR SUPERCONDUCTING ELECTRICAL MACHINE

(71) Applicant: GE Precision Healthcare LLC, Waukesha, WI (US)

(72) Inventors: Dogan Celik, Ashburn, VA (US); Stuart Feltham, Florence, SC (US); Ernst Stautner, Niskayuna, NY (US); Charles Yarborough, Florence, SC (US)

(73) Assignee: GE Precision Healthcare LLC, Waukesha, WI (US)

( * ) Notice: Subject to any disclaimer, the term of this patent is extended or adjusted under 35 U.S.C. 154(b) by 194 days.

(21) Appl. No.: 18/813,974

(22) Filed: Aug. 23, 2024

(65) Prior Publication Data

US 2026/0058536 A1 Feb. 26, 2026

(51) Int. Cl.

| | |
|---|---|
| ***H01F 6/04*** | (2006.01) |
| ***H01F 6/00*** | (2006.01) |
| ***H02K 9/19*** | (2006.01) |
| ***H02K 55/00*** | (2006.01) |

(52) U.S. Cl.

CPC ................ *H01F 6/04* (2013.01); *H01F 6/00* (2013.01); *H02K 9/19* (2013.01); *H02K 55/00* (2013.01)

(58) Field of Classification Search

CPC .. H02K 55/00; H02K 9/19; H01F 6/00; H01F 6/04

See application file for complete search history.

(56) References Cited

U.S. PATENT DOCUMENTS

| | | | | |
|---|---|---|---|---|
| 8,027,139 | B2 | 9/2011 | Beier | |
| 8,922,308 | B2 | 12/2014 | Stautner | |
| 11,275,136 | B2 | 3/2022 | Voss | |
| 11,309,110 | B2 | 4/2022 | Mine et al. | |
| 2015/0168079 | A1 | 6/2015 | Stautner et al. | |
| 2021/0262701 | A1 | 8/2021 | Stautner | |
| 2023/0377787 | A1* | 11/2023 | Overweg | H01F 6/04 |
| 2024/0125521 | A1* | 4/2024 | Wakuda | F25B 21/00 |
| 2024/0136097 | A1 | 4/2024 | Celik et al. | |
| 2024/0136098 | A1 | 4/2024 | Celik et al. | |

FOREIGN PATENT DOCUMENTS

| | | |
|---|---|---|
| GB | 2592380 | 9/2021 |
| WO | 2006051251 | 5/2006 |

* cited by examiner

*Primary Examiner* — Mohamad A Musleh
(74) *Attorney, Agent, or Firm* — Andrus Intellectual Property Law, LLP

(57) ABSTRACT

A superconducting electrical system includes a superconducting electrical machine comprising a superconducting magnet, a main cryogenic vessel containing a main cryogen and encompassing the superconducting magnet, and a vacuum vessel encompassing the main cryogenic vessel. A supplemental cooling system is inside the vacuum vessel and comprises a supplemental heat sink and. a gas gap heat switch configured to alternately thermally connect the supplemental heat sink to a component of the superconducting electrical machine and thermally isolate the supplemental heat sink from the component of the superconducting electrical machine. The supplemental cooling system is configured to supplement cooling of the superconducting electrical machine by the main cryogenic vessel to expedite cooling of the component of the superconducting electrical machine.

20 Claims, 11 Drawing Sheets

SUPPLEMENTAL COOLING SYSTEM FOR SUPERCONDUCTING ELECTRICAL MACHINE

BACKGROUND

The present disclosure generally relates to superconducting electrical machines, and specifically to cooling systems for superconducting electrical machines.

Superconducting electrical machines utilizing superconducting magnets are known and used for various purposes, including medical imaging, power generation. Superconducting magnets must be maintained at a cryogenic temperatures, and are thus maintained in sealed vessels providing vacuum conditions to minimize heat transfer from the exterior. Cooling systems are housed within the sealed vacuum vessel and are devised to transfer heat generated within the superconducting system to the exterior. Thus, such systems typically include a cryogenic vessel within the vacuum vessel and traditionally rely on heat absorption capability of a liquid cryogen, such as helium, hydrogen, or neon coupled with a cryocooler to cool the superconducting magnet and other elements within the vacuum vessel.

Superconducting electrical machines comprising a superconducting magnet are utilized and configured for varying purposes, including for magnetic resonance imaging and as a superconducting generator (e.g., for a wind turbine). These are non-limiting examples of superconducting electrical machines that the disclosed supplemental cooling system may be utilized with. The supplemental cooling system is thermally connected to and configured to cool at least one component of the superconducting electrical machine, which may be any portion of the superconducting electrical machine. For example, the supplemental cooling system may be used to cool a component of a superconducting electrical machine that intermittently generates significant heat, such as a portion of the superconducting electrical machine that generate heat when conducting significant amounts of current during certain portions of the operation of the superconducting electrical machine. To provide a few examples, the components of the superconducting electrical machine may be a superconducting switch and/or a power ramp lead configured to ramp up and ramp down the magnetic field generated by the superconducting magnet. The superconducting switch may be a magnet switch configured to power up a magnet from a power supply and then provide consistent magnet operation (such as for MRI and NMR), or the superconducting switch may be configured to intermittently connect a power supply to allow for a trickle current magnet field top up and to ensure the magnets can be ramped down quickly as needed (such as for a superconducting magnet in a wind turbine).

Magnetic resonance (MR) systems for magnetic resonance imaging (MRI) are one example of such superconducting machines, which generate images by subjecting objects with high hydrogen content (such as human tissue) to a uniform magnetic field (polarizing field $B_0$), which causes the individual magnetic moments of the spins in the tissue attempt to align with this polarizing field, but precess about it in random order at their characteristic Larmor frequency. If the substance, or tissue, is subjected to a magnetic field (excitation field B1) which is in the x-y plane and which is near the Larmor frequency, the net aligned moment, or "longitudinal magnetization", $M_z$, may be rotated, or "tipped", into the x-y plane to produce a net transverse magnetic moment, $M_t$. A signal is emitted by the excited spins after the excitation signal $B_1$ is terminated and this signal may be received and processed to form an image.

MR systems may utilize superconducting magnets using NbTi conductor, other superconductors can be employed at similar or higher temperatures to NbTi. Also, MR systems require a cooling system may utilize a cryogen (very cold liquid) to operate. Ramp leads are utilized for energizing superconducting magnets for MRI (as well as other types of superconducting machines such as motors and generators). Often times, these ramp leads can be fixed (permanently in place) or detachable/retractable and, thus, have moving parts.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one aspect of the disclosure, a superconducting electrical system includes a superconducting electrical machine comprising a superconducting magnet, a main cryogenic vessel containing a main cryogen and encompassing the superconducting magnet, and a vacuum vessel encompassing the main cryogenic vessel. A supplemental cooling system is inside the vacuum vessel and comprises a supplemental heat sink and a gas gap heat switch configured to alternately thermally connect the supplemental heat sink to a component of the superconducting electrical machine and thermally isolate the supplemental heat sink from the component of the superconducting electrical machine. The supplemental cooling system is configured to supplement cooling of the superconducting electrical machine by the main cryogenic vessel to expedite cooling of the component of the superconducting electrical machine.

In one embodiment, the supplemental heat sink is a cryogen tank comprising a second cryogen. Optionally, the second cryogen may be a different cryogen than the main cryogen. Optionally, the main cryogen and the second cryogen each contain at least one of helium, hydrogen, neon, or nitrogen.

In another embodiment, the supplemental heat sink is a cryocooler.

In another embodiment, the supplemental heat sink is at least a portion of a thermal shield surrounding the superconducting magnet.

In another embodiment, the supplemental heat sink is thermally connected to the main cryogenic vessel so as to slowly dissipate heat thereto.

In another aspect of the disclosure, a magnetic resonance imaging system includes a superconducting electrical machine comprising a superconducting magnet, a main cryogenic vessel containing a main cryogen and encompassing the superconducting magnet and configured to cool the superconducting magnet, and a vacuum vessel encompassing the main cryogenic vessel. A supplemental cooling system is inside the vacuum vessel and comprises a supplemental heat sink and a gas gap heat switch configured to alternately thermally connect the supplemental heat sink to a component of the superconducting electrical machine and thermally isolate the supplemental heat sink from the component of the superconducting electrical machine. The supplemental cooling system is configured to supplement cooling of the component of the superconducting electrical machine by the cryogenic vessel to expedite cooling of the component of the superconducting electrical machine.

In one embodiment, the supplemental cooling system includes at least a first gas gap heat switch configured to thermally connect the supplemental heat sink to the component and a second gas gap heat switch configured to connect the component to a different heat sink than the supplemental heat sink.

In another embodiment, the superconducting electrical machine includes a superconducting switch coupled to the superconducting electrical machine and configured to switch between a resistive mode and a superconducting mode. The gas gap heat switch is configured to thermally connect the supplemental heat sink to the superconducting switch when the superconducting switch is in the resistive mode and thermally isolate the supplemental heat sink from the superconducting switch when the superconducting switch is in the superconducting mode.

In another embodiment, the superconducting electrical machine includes a power ramp lead disposed within the vacuum vessel and having a first end and a second end, wherein the first end of the power ramp lead is coupled in a fixed manner to a vacuum vessel wall and the second end is coupled to directly or indirectly to a superconducting switch. The gas gap heat switch is configured to thermally connect the supplemental heat sink to the power ramp lead when the superconducting switch is in a resistive mode and thermally isolate the supplemental heat sink from the power ramp lead when the superconducting switch is in a superconducting mode.

In another aspect of the present disclosure, a method of controlling a supplemental cooling system for a superconducting electrical system includes controlling a first gas gap heat switch connected to a component of the superconducting electrical system to thermally connect the component to a supplemental heat sink, then after a temperature of the component is less than a first threshold temperature, controlling the first gas gap heat switch to thermally isolate the component from the supplemental heat sink. Heat is then slowly dissipated from the supplemental heat sink to a main heat sink over a period of time while the first gas gap heat switch is thermally isolating the component from the supplemental heat sink.

In one embodiment, after the component is cooled to a second threshold temperature via the supplemental heat sink, the method further includes controlling a second gas gap heat switch connected to the component of the superconducting electrical system to thermally connect the component to a different heat sink than the supplemental heat sink. After the temperature of the component is less than a third threshold temperature, the second gas gap heat switch is controlled to thermally isolate the component from the different heat sink.

In one embodiment, the third threshold temperature is lower than the first threshold temperature and the second threshold temperature.

In one embodiment, the first threshold temperature and the second threshold temperature are the same.

In another embodiment, the first threshold temperature and the second threshold temperature are different.

In another embodiment, the first threshold temperature is greater than the second threshold temperature.

In another embodiment, the component is a superconducting switch of the superconducting electrical system.

In another embodiment, the component is a power ramp lead of the superconducting electrical system.

In another embodiment, the superconducting electrical system comprises a magnet system for generating a magnetic field in a magnetic resonance imaging system.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
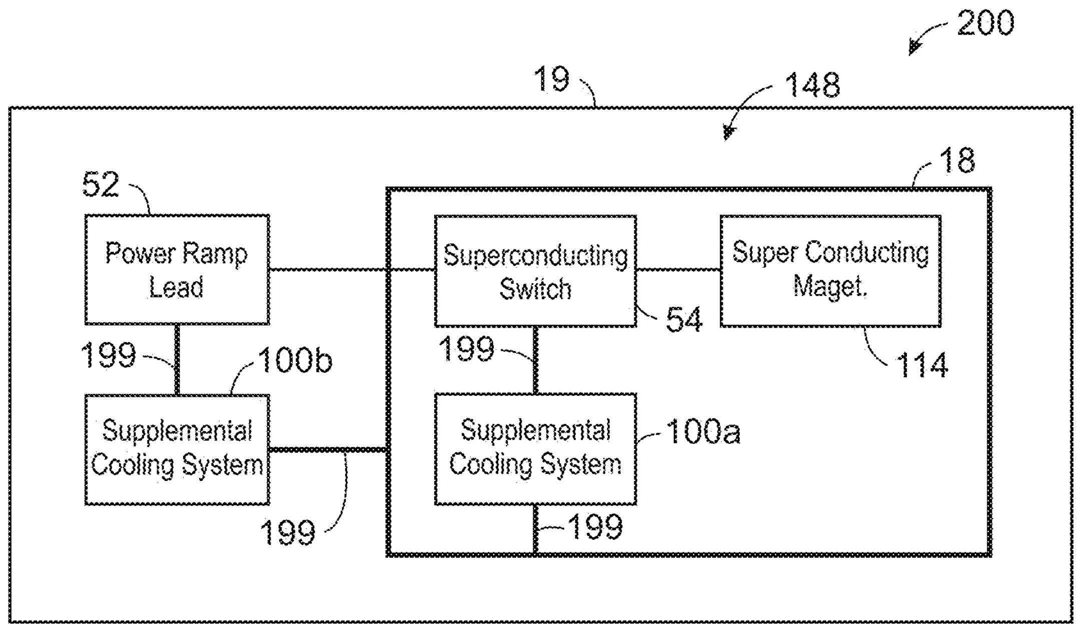
FIG. 1 is a schematic diagram of an exemplary superconducting electrical system comprising a superconducting magnet and a supplemental cooling system in accordance with some embodiments of the present disclosure.

In the present description, certain terms have been used for brevity, clarity and understanding. No unnecessary limitations are to be inferred therefrom beyond the requirement of the prior art because such terms are used for descriptive purposes only and are intended to be broadly construed.

As used herein, unless otherwise limited or defined, discussion of particular directions is provided by example only, with regard to particular embodiments or relevant illustrations. For example, discussion of "top," "bottom," "front," "rear," "left," "right," "horizontal," "vertical," and "longitudinal" features and/or relative motion, e.g., movement "up" and "down," is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally or alternatively, embodiments may be arranged in a different orientation such that "top" and "bottom" features are arranged horizontally relative to each other, for example in a "left-to-right" orientation.

The use herein of the terms "including," "comprising," or "having," and variations thereof, is meant to encompass the elements listed thereafter and equivalents thereof, as well as additional elements. Embodiments recited as "including,"

"comprising," or "having" certain elements are also contemplated as "consisting essentially of" and "consisting of" those certain elements.

The disclosed cooling systems and methods are configured to provide supplemental cooling that adds cooling capacity to a main cryogenic cooling system of a superconducting electrical machine to cool one or more of its components more quickly, particularly to absorb and store heat while the said component(s) are performing a heat-generating activity. Superconducting electrical machines comprising superconducting magnets are utilized and configured for varying purposes, including for magnetic resonance and as a superconducting generator (e.g., for a wind turbine). These are non-limiting examples of superconducting electrical machines that the disclosed supplemental cooling system may be utilized with.

Heat management is a challenge in all superconducting electrical machines, which include superconducting magnets that must be maintained at or near the low end of the cryogenic temperature range, which is below 120K (−153° C.). During operation of the superconducting electrical machine, components of the machine may generate heat, which must be dissipated out of the system. The main cryogenic cooling system may be insufficient for quickly dissipating the heat from all parts of the system and is often configured to prioritize cooling the superconducting magnet. The inventors have recognized that this is particularly a problem for low-cryogen superconducting electrical machine systems, where the heat absorbing capacity of the main cryogenic cooling system is not able to absorb all of the heat generated by all of the elements during peak operation and heat generation. Due to reduced availability of certain cryogens, such as liquid helium, low cryogen sealed superconducting electrical machines that have very limited cryogen capacity (e.g., a few liters of helium), are increasing in popularity.

For example, ramping a superconducting magnet generates heat in the main ramp switch and ramp leads, which needs to be absorbed to keep the temperature under control. At the end of ramping, the switch and leads need to be cooled down to become superconducting. The amount of heat may be too much to handle for the limited supply of helium in the main cryogenic vessel of a sealed magnet system. Magnets with main ramp switches comprising copper matrix super conductors are particularly vulnerable.

Thus, the inventors have recognized a need for supplemental cooling systems that can absorb heat during peak operations and slowly dissipate that heat during low operation times where the main cooling system has excess capacity to dissipate the heat. Namely, the inventors have recognized a need for a cooling system that can be used selectively during peak heat generation times so that too much heat is not transferred into the main cryogenic cooling system, risking overheating the superconducting magnet or other components. The inventors have thus developed this disclosed supplemental cooling system that provides an additional heat sink and is configured to store heat generated by one or more components of the superconducting electrical machine during peak operation times, such as when power running through the magnet is ramped up, and to slowly dissipate that heat through the main cooling system during lower operation times. For example, the supplemental heat sink may be a cryogen tank containing a cryogen (such as liquid helium, hydrogen, neon, or nitrogen) or may be a cryocooler. Alternatively, the supplemental heat sink may be a solid, such as a thermal shield (e.g., a thermal shield of an MRI magnet).

The inventors have further recognized that the supplemental heat sink needs to be quickly connected to the heat generating component to absorb the heat, and then disconnected from the heat-generating component once the high-heat task is completed and the temperature of the component is sufficiently reduced so that the stored heat is not immediately transferred back into the component, and thus back into the superconducting electrical machine and system. Thus, the inventors recognized that the component and the heat sink must be separated by a switch, wherein the switch is capable of thermally connecting the component to the heat sink to enable heat transfer to the heat sink, and thermally isolating, or disconnecting, the component from the heat sink once cooling has occurred to prevent heat from being transferred from the heat sink back into the component, and thus back into the superconducting electrical machine assembly.

The disclosed system includes at least one gas gap heat switch configured to alternately connect and isolate a heat-generating component, such as a ramp switch or ramp leads, to a heat sink such as a cryogen tank or a cryocooler or another solid inside the vacuum vessel structure. The gas gap heat switch enables efficient thermal connection and transfer of heat from the heat-generating source to a heat sink to keep the temperature under control during peak operation. Once the transfer of heat generated during peak operation is complete, the gas gap heat switch is opened to disconnect the heat sink from the component. The gas gap heat switch is configured to enable a sufficiently fast and complete isolation between the heat-generating component and the heat sink to prevent back streaming of heat to the component. The disclosed gas gap heat switch operates well in the vacuum conditions of various superconducting electrical machines and provides sufficiently fast connection and heat transfer to be helpful as a supplemental cooling system that can be turned on to absorb heat during peak heat-generating operation of the component. Further, the gas gap heat switch and heat sink arrangement are relatively small and can be installed in any orientation, and thus are well-suited for the confined space of a superconducting electrical system, such as an MRI system or a wind turbine. The gas gap heat switch and heat sink can be installed and operated in any orientation, which makes the disclosed system superior to other heat transfer devices, such as thermo-syphons and heat pipes.

In some embodiments, multiple heat switches and/or heat sinks may be used, such as each associated with one of multiple components or multiple heat switches configured to cool a single component. Thus, multiple heat switches may be used to connect the warmed up component to one or more heat sinks to speed up the cool down process or distribute the heat to multiple heat sinks. Each gas gap heat switch may be connected to its own distinct heat sink, thus the system may include multiple supplemental heat sinks. Alternatively, two or more gas gap heat switches may connect to a single, larger supplemental heat sink. Where multiple gas gap switches are connected to a single component, they may each be configured to open and/or close at different temperatures and thus to manage different portions, or temperature ranges, of the cooling process. Multiple embodiments of supplemental cooling systems are described herein, including examples of systems including multiple gas gap heat switches configured to connect and isolate multiple heat sinks from a single component in a superconducting electrical system.

The disclosed supplemental cooling system comprising a gas gap heat switch and heat sink enables absorption and storage of much of the heat generated by a component, and thus the thermal link between that component and the main cryogenic cooling system can be reduced or eliminated. This reduces the cooling burden of that/those component(s) on the main cooling system, and thus enables a capacity reduction of the main cryogenic cooling system used to cool the superconducting magnet and thus a lesser volume (and lesser weight) of cryogen can be used. For example, where the component is the ramp switch and/or the ramp lead assembly, the thermal link between the ramp switch and/or the ramp lead assembly and the main cryogen vessel, e.g., helium circuit, can be made small (e.g., narrow in diameter copper pipe) such that the main cooling system absorbs only a portion of the heat generated by the ramp switch and/or the ramp lead assembly during ramping.

The supplemental cooling system connects the ramp switch and/or the ramp lead assembly to a supplemental heat sink during the ramping process, which is configured to transfer most of heat generated during ramping to the secondary heat sink. For example, during closing of main ramp switch the gas gap heat switch opened to disconnect the ramp switch from the supplemental heat sink. In some embodiments, when the main ramp switch (or other component) is disconnected from the supplemental heat sink, another heat switch (such as a second gas gap heat switch) is closed to connect the main ramp switch to the main cryogenic cooling system, such as a liquid helium tank that distributes liquid helium to cool the superconducting magnet. This finishes up the cool down of the component using the main cooling system, but reduces the cooling burden on the main cooling system and thus enables reduction in the amount of cryogen storage. Where the cryogen is liquid helium, the amount of helium quantity can easily be reduced to less than 25% of the original amount needed without the disclosed supplemental cooling system.

FIG. 1 is a schematic diagram exemplifying a superconducting electrical system 200 comprising at least one supplemental cooling system 100. The superconducting electrical system 200 comprises a superconducting electrical machine 148 comprising a superconducting magnet 114, such as an MRI field generating magnet system or a power generator (e.g., in a wind turbine). The superconducting electrical machine 148 is contained within a vacuum vessel 19. A main cryogenic vessel 18 encompasses and is configured to cool the superconducting magnet 114. The cooling source (not shown) of the main cryogenic vessel 18 may be, for example, a cryocooler. The cooling effect of cryocooler may be distributed around the superconducting device using liquid helium contained in tubes and or high thermal conductivity solids like copper. The main cryogenic vessel may include a thermal shield. A power ramp lead 52 couples to and provides electrical power to a superconducting switch 54, which are together configured to control current so as to excite the magnet 114 to operate in a persistent current mode to generate a magnetic field. The superconducting switch 54 includes windings and is configured to switch between a resistive mode and a superconducting mode.

During ramp-up of the magnet 114, the superconducting switch 54 is electrically connected to a power source in parallel with the magnet 114. To generate the magnetic field, the superconducting switch 54 operates in the resistive mode such that electric current from the power supply is injected into the superconducting magnet coils. When the electric current flowing through the superconducting coils reaches a desired level for producing the field strength of the magnetic field, the superconducting switch 54 is switched to operate at the superconducting mode and the external power source is disconnected. During ramp-down of the magnet 114, the magnetic field produced by the superconducting magnet 114 is reduced by again switching the superconducting switch 54 to operate from the superconducting mode to the resistive mode. In the resistive mode, the flow of current through resistance generates heat. The heat generated by the superconducting switch 54 operating in the resistive mode must be absorbed by a cooling system.

The switching is accomplished by changing the temperature of superconducting switch 54. In the resistive mode, the superconducting switch 54 operates at a temperature above the superconducting temperature of the windings of the switch. In the superconducting mode, the superconducting switch 54 operates at the superconducting temperature, such as 4 K, of the windings of the superconducting switch 54. The superconducting switch 54 is cooled by the supplemental cooling system 100*a*, which may be configured to absorb a majority of the heat generated by the superconducting switch 54 during ramp-up of the magnet 114. The superconducting switch 54 is connected to the supplemental cooling system 100*a* by a thermal connection 199, or thermal link, configured to transfer heat. The superconducting switch 54 may also be cooled by the main cryogenic vessel 18, such as to absorb the remainder of the heat not initially absorbed by the supplemental cooling system 100*a*. The main cryogenic vessel may also be utilized to eventually cool the supplemental cooling system, such as to slowly dissipate the heat therefrom while the superconducting switch is operating in the superconducting mode. A heater may be used to heat the superconducting switch 54 as needed to switch to control switching from the superconducting mode to the resistive mode.

The power ramp lead 52 may be a fixed ramp lead assembly, or may be a removable ramp lead assembly. A supplemental cooling system 100*b* may be configured to cool the power ramp lead 52, particularly where the power ramp lead includes a fixed ramp lead assembly. In such an embodiment, the power ramp lead 52 (or some portion thereof) is connected to the supplemental cooling system 100*b* by a thermal connection 199 configured to transfer heat. The supplemental cooling system 100*b* configured to cool the power ramp lead 52 may be in addition to the supplemental cooling system 100*a* configured to cool the superconducting switch, or the system 200 may include only one supplemental cooling system 100, which may be configured to cool either one or both of the superconducting switch 54 or the power ramp lead 52. Thus, the superconducting electrical system 200 may include one supplemental cooling system 100 or a plurality of supplemental cooling systems (e.g., 100*a* and 100*b*). The one or more supplemental cooling systems 100 may be configured to cool any one or more of several different components of the superconducting electrical system 200, such as the power ramp lead 52 and/or the superconducting switch 54 as shown in the example depicted in FIG. 1. Wherever a supplemental cooling system 100*a*, 100*b* is configured to cool a component, a thermal connection 199 thermally connects the component to be cooled to the supplemental cooling system, which comprises a gas gap heat switch and heat sink (see FIG. 4). The supplemental cooling system 100*a*, 100*b* may also be thermally connected to the main cryogenic vessel 18 via a thermal connection 199. For example, the thermal connections may be a copper strap or a heat pipe.

Figure 2:
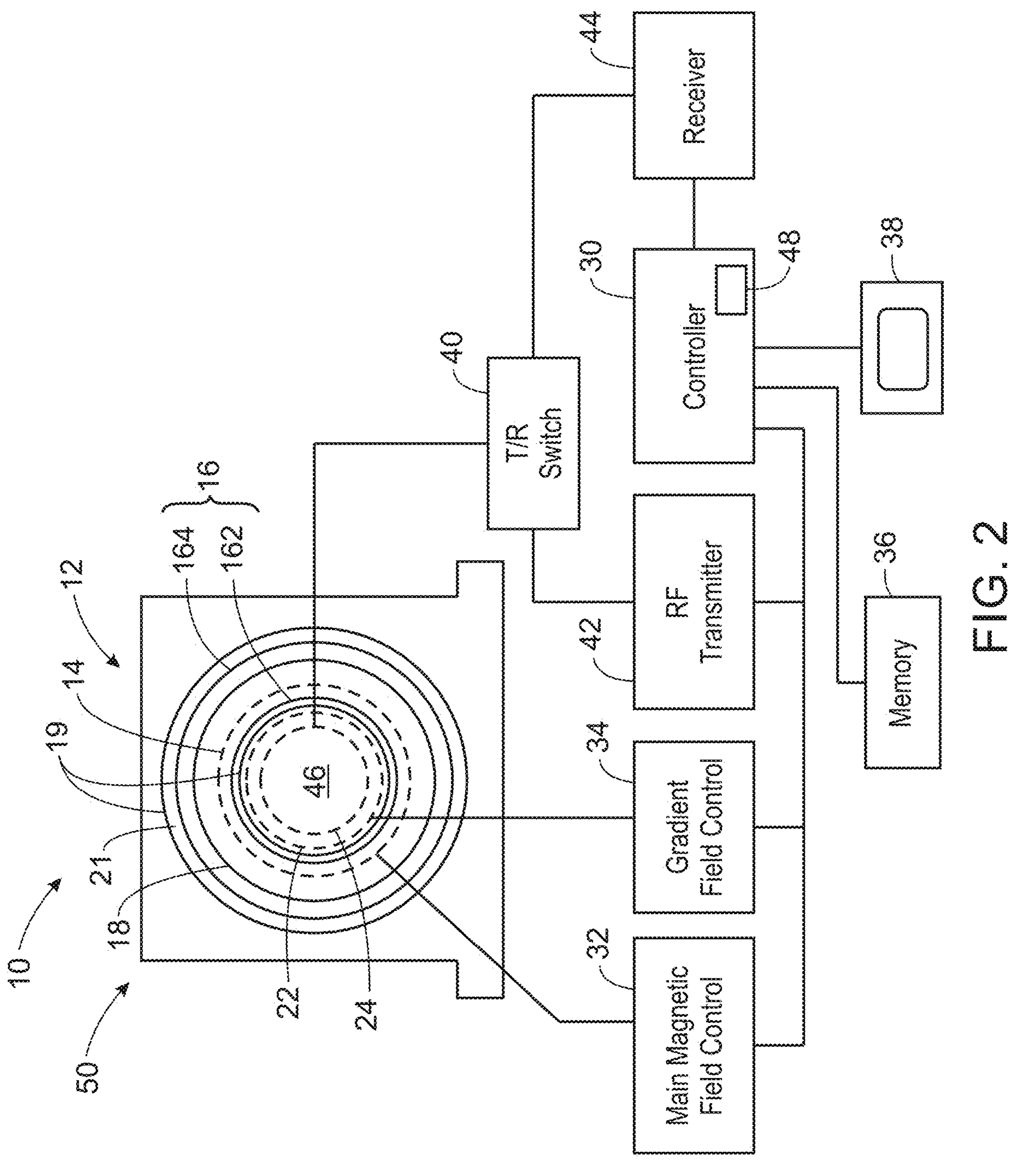
FIG. 2 is a schematic diagram of an example magnetic resonance system, in accordance with aspects of the present disclosure.
Figure 3:
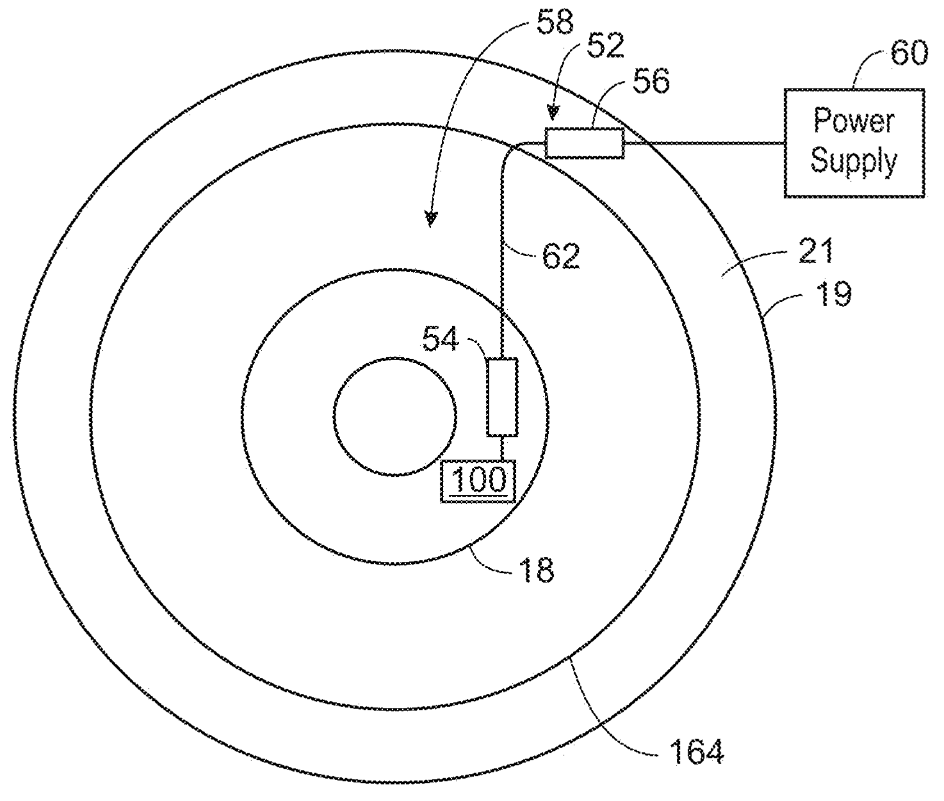
FIG. 3 is a schematic diagram of a cross section of an example magnetic resonance system with a power ramp lead coupled to a superconducting switch, in accordance with aspects of the present disclosure.

FIGS. 2 and 3 depict an exemplary superconducting electrical system being a magnet assembly 12 for an MR system 10. FIG. 2 is schematic block diagram of an example MR system 10 used to generate magnetic resonance images of a subject. In the example embodiment, MR system 10 includes a magnet assembly 12 that includes a magnet 14. The magnet 14 is a superconducting magnet formed from a plurality of magnetic coils wound around a magnetic coil support or a coil former. Magnet 14 is configured to generate a polarizing magnetic field. As described in greater detail below, the MR system 10 includes a current ramp lead assembly and superconducting switch 54 configured to control current through the superconducting magnet 14.

Magnet assembly 12 may include a main cryogenic vessel 18, such as a cryostat vessel, that surrounds magnet 14. Cryostat vessel 18 is typically filled with a cryogenic fluid or cryogen which is used to cool the superconducting coils into an extremely low temperature, e.g., 4 Kelvin (K), such that electric current continues to flow through the superconducting coils without electrical resistance to maintain a uniform and static magnetic field after a power supply is disconnected. Cryogen may be helium, hydrogen, neon, nitrogen, or any combination thereof, in a liquid form, a gaseous form, solid form, or a combination thereof. Helium is described as an example cryogen; however, any of the forgoing cryogens may be used. In some examples, the cryogen may be slush hydrogen (e.g., at 13 K), solid neon, or solid nitrogen.

Referring to FIGS. 1-3, magnet assembly 12 may also include a thermal shield assembly 16 that encloses main cryogenic vessel 18 and magnet 14 therein. In one embodiment, thermal shield assembly 16 may include an inner thermal shield member 162 and an outer thermal shield member 164. Inner thermal shield member 162 may be generally cylindrical in shape and is radially placed inside of magnet 14. Inner thermal shield member 162 is configured to prevent heat being radiated from a warm region where the subject is placed to a cold region where magnet 14 is placed. Outer thermal shield member 164 is arranged concentrically with respect to inner thermal shield member 162. Thus, outer thermal shield member 164 may also have a generally cylindrical shape and is radially placed outside of magnet 14. Outer thermal shield member 164 is configured to prevent heat being radiated from environment into magnet 14. Thermal shield assembly 16 is made from metal materials, such as aluminum. In some embodiments, magnet assembly 12 may also include a vacuum vessel 19 (e.g. having a vacuum vessel wall 21) surrounding thermal shield assembly 16 and insulating magnet 14 from the environment during operation.

In the example embodiment, MR system 10 also includes a gradient coil assembly 22 placed inside of inner thermal shield member 162. Gradient coil assembly 22 is configured to selectively impose one or more gradient magnetic fields along one or more axes, such as x, y, or z axes. MR system 10 also includes RF coil 24. RF coil 24 may be a transmitter coil, which is configured to transmit RF pulses. RF coil 24 may be a receiver coil, which is configured to detect MR signals from the subject. RF coil 24 may be a transmit and receive coil that transmits and also detect MR signals. Magnet assembly 12, gradient coil assembly 22, and body RF coil 24 are collectively referred to as a scanner assembly 50, because scanner assembly 50 forms into one unit and is in a scanner room. Scanner assembly 50 has a bore 46, where the subject is positioned during scanning. Scanner assembly 50 shown in FIG. 1 is a closed bore system, where the bore is cylindrical. Scanner assembly 50 may be magnet assemblies of other designs, such as an open-bore system, a dipolar electromagnet configuration, or a Hallbach configuration.

In the example embodiment, MR system 10 also includes a controller 30, a magnetic field control 32, a gradient field control 34, a memory 36, a display device 38, a transmit/receive (T/R) switch 40, an RF transmitter 42, and a receiver 44. In operation, a subject is placed in bore 46 on a suitable support, for example, a motorized table (not shown) or other patient table. Magnet 14 produces a uniform and static magnetic field B0 across bore 46. Strength and homogeneity of the magnet field B0 in bore 46 and correspondingly in patient is controlled by controller 30 via magnetic field control 32, which also controls a supply of energized current to magnet 14. Gradient coil assembly 22 is energized by gradient field control 34 and is also controlled by controller 30, so that one or more gradient magnetic fields are imposed on the magnetic field B0. RF coil 24 and a receive coil, if provided, are selectively interconnected to one of RF transmitter 42 or receiver 44, respectively, by T/R switch 40. RF transmitter 42 and T/R switch 40 are controlled by controller 30 such that RF field pulses or signals are generated by RF transmitter 42 and are selectively applied to the subject for excitation of magnetic resonance in the subject.

In the example embodiment, following application of the RF pulses, T/R switch 40 is again actuated to decouple RF transmit coil 24 from RF transmitter 42. The detected MR signals are in turn communicated to controller 30 which may organize the MR signals in a particular format for storage in memory 36. Controller 30 includes a processor 48 that controls the processing of the MR signals to produce signals representative of an image of the patient, which are transmitted to display device 38 to provide a visual display of the image.

Superconducting magnet 14 of magnet assembly 12 is used to generate a magnetic field in MR system 10 by electric current flowing along magnet windings of magnet 14. The current is in the range of hundreds of amperes. In some known systems, an electric current from a power source is constantly applied to the magnet to produce the magnetic field. A constant supply of the high electric current would significantly increase the running cost of an MR system. Magnet 14 is a superconducting magnet, where magnet 14 operates at a superconducting temperature, such as 4 K, of wire windings of magnet 14 such that winding wires do not have electrical resistance to the current and external power source is not needed. This mode of operation of magnet 14 is referred to as a persistent current mode. Exemplary embodiments of the magnet assembly are shown and escribed at US Patent publication No. 2024/0136098

The superconducting switch is located within the vacuum vessel 19. In the example shown in FIG. 3, the superconducting switch 54 is located within the main cryogenic vessel 18. In other embodiments, the superconducting switch 54 may be located between an outer thermal shield member and the cryogenic vessel 18. Exemplary embodiments of superconducting switches are disclosed at US Patent Publication 2024\0136097.

FIG. 3 depicts an MR system 10 comprising a power ramp lead 52 that includes a fixed (or permanent) ramp lead assembly 56. In such an embodiment, the fixed ramp lead assembly 56 may be disposed within a space 58 between the vacuum vessel wall 21 of the vacuum vessel 19 and the outer thermal shield member 164. A portion of the fixed ramp assembly is located outside the vacuum vessel wall (where the temperature is an ambient temperature) and is coupled to an external power supply 60. The current or power lead 52 also includes a high temperature superconducting power lead 62 that couples to and provides electrical power to the superconducting switch 54. An exemplary embodiment of a power ramp lead comprising a fixed ramp lead assembly is shown and described in U.S. patent application Ser. No. 18/428,677.

Referring again also to FIG. 1, the superconducting electrical system 200 (such as the magnet assembly 12 just described) includes at least one supplemental cooling system 100, and may include a plurality of supplemental cooling systems (e.g., 100*a* and 100*b*) configured to cool any one or more of several different components of the superconducting electrical system 200, such as the power ramp lead 52 and/or the superconducting switch 54 as shown in FIG. 1. FIG. 3 depicts an embodiment comprising a supplemental cooling system 100 configured to cool the superconducting switch 54.

Figure 4:
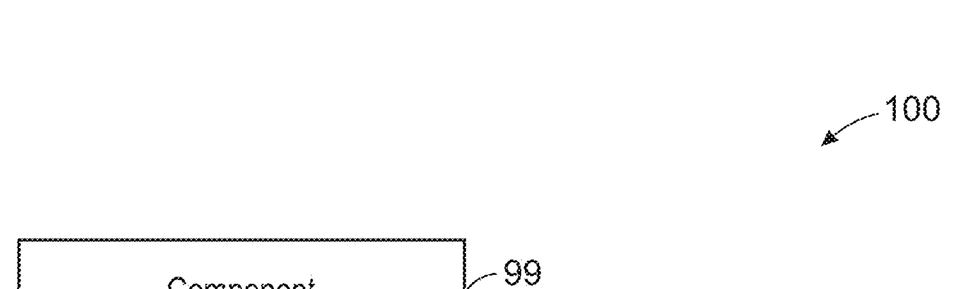
FIG. 4 is a schematic diagram of a supplemental cooling system with a gas gap heat switch, according to embodiments of the present disclosure.
Figure 4:
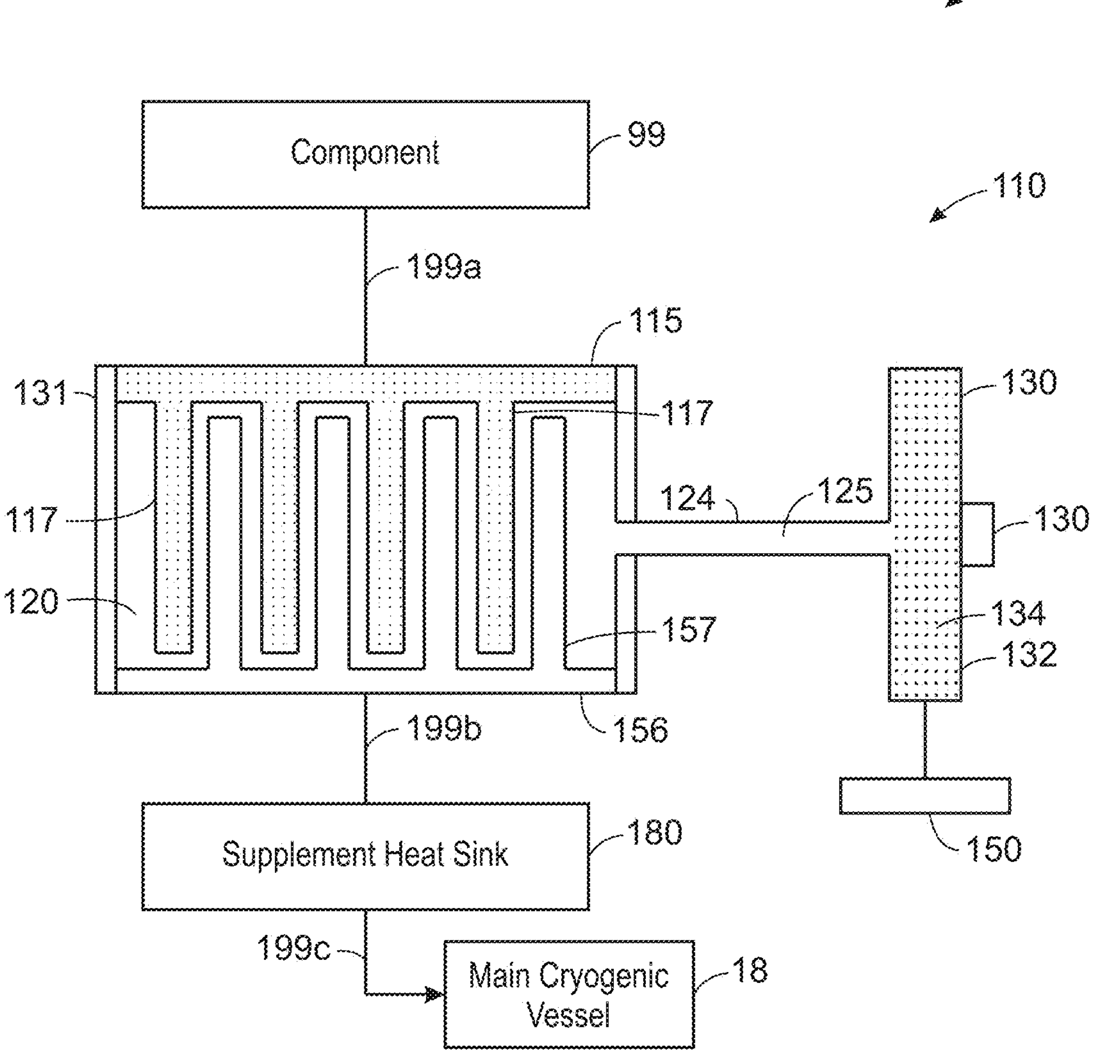

FIG. 4 is a diagram of an exemplary supplemental cooling system 100. The supplemental cooling system 100 includes a gas gap heat switch 110 and a supplemental heat sink 180. The gas gap heat switch is thermally connected to a component 99 of the superconducting electrical system, such as the superconducting switch 54 and/or the power ramp lead 52 shown and described above. The component 99 is thermally connected to a component side 115 of the gas gap heat switch 110 by a thermal connection 199*a*. The gas gap heat switch 110 is also connected to a heat sink 180, having a heat sink side 156 connected to the supplemental heat sink 180 by the thermal connection 199*b*. For example, the thermal connection may be a piece of copper material.

The gas gap heat switch includes two sets of fins, including component side fins 117 on the component side 115 and heat sink side fins 157 on the heat sink side 156. The two sets of fins 157 which are assembled together without touching each other in a low conductivity shell such that there is a gas gap 120 separating the sets of fins 117 and 157. The fins 117 and 157 are formed of thermally conductive material, such as copper, and are thermally connected to the component and the heat sink, respectively. Namely, the component side fins 117 are connected to the heat generating component 99, such as the superconducting switch 54 or the power ramp lead 52. The heat sink side fins 157 are thermally connected to the supplemental heat sink 180, such as a cryogen tank or cryostat. The fins 117 and 157 are housed in a sealed housing 131, which provides sealed conditions and enables vacuum conditions at low temperatures. For example, the housing 131 may be comprised of a very thin wall of stainless steel.

A sorption pump 130 is provided and configured in fluid connection with the gas gap 120 and configured to thermally "open" and "close" the heat switch 110 by adding and removing gas molecules into the gas gap 120. The sorption pump 130 includes a sorption material 134, or getter, that absorbs and traps the gas molecules when the sorption material 134 is cold, such as around 4 K, so as to create a vacuum that thermally isolates the fins 117 and 157 from one another. In such a state, the heat switch 110 is "open" and does not allow (or minimizes) heat transfer between the fins. When the sorption material is warmed, it releases the absorbed gas into the gas gap 120, which enables thermal conductivity between the fins 117 and 157. In this warmed state, the gas gap heat switch is "closed" and conducts heat from the warmer component side fins 117 to the cooler heat sink side fins 157, which then conducts the heat to the heat sink 180. For example, the heat sink may be a cryogen tank or cryocooler that starts at about 4 K when the gas gap heat switch is closed.

The gas gap 120 may contain any of various suitable gases, and the amount of gas added to the gas gap is calibrated so that the gas gap heat switch 110 opens and closes at the designed temperatures. The switch conductance when it is closed can be on the order of hundreds, or even thousands, of $W/m^2$ K. When the gas is removed from the gas gap 120, there is nothing to transfer heat from one set of fins to the other, in which case the switch conductance drops significantly, such as below 1 $W/m^2$ K value. In this state where the gas gap 120 is a vacuum, the gas gap heat switch is "open" and thus minimal or no heat is being conducted to the supplemental heat sink 180. The supplemental heat sink has a thermal link 199*c* to the main cryogen vessel 18 to dissipate the stored heat over time. The thermal link 199*c* between the supplemental heat sink 180 and the main cryogen vessel 18 may be a relatively weak thermal link so that the heat dissipates relatively slowly into the main cryogen so as not to overheat the main cooling system.

The sorption material 134 is contained in a housing 132. The sorption material 134 may be, for example, charcoal or other porous material with large surface area, e.g. zeolites, that enables trapping gas molecules when cold. The housing 132 of the sorption pump 130 is connected to the gas gap 120 by a gas connector 124 providing a passageway 125 for transfer of gas into and out of the gas gap 120 between the fins 117 and 157. The housing 131, gas connector 124, and sorption pump housing 132 with a calibrated amount of gas within. The amount of gas in the sealed system, the size of the sorption pump housing 132, the amount of sorption material 134, and the length and diameter of the gas passageway 125 are configured to enable the gas gap switch 110 to turn on, or "close", at a specified high temperature and turn off, or "open", at a specified low temperature.

Figure 5:
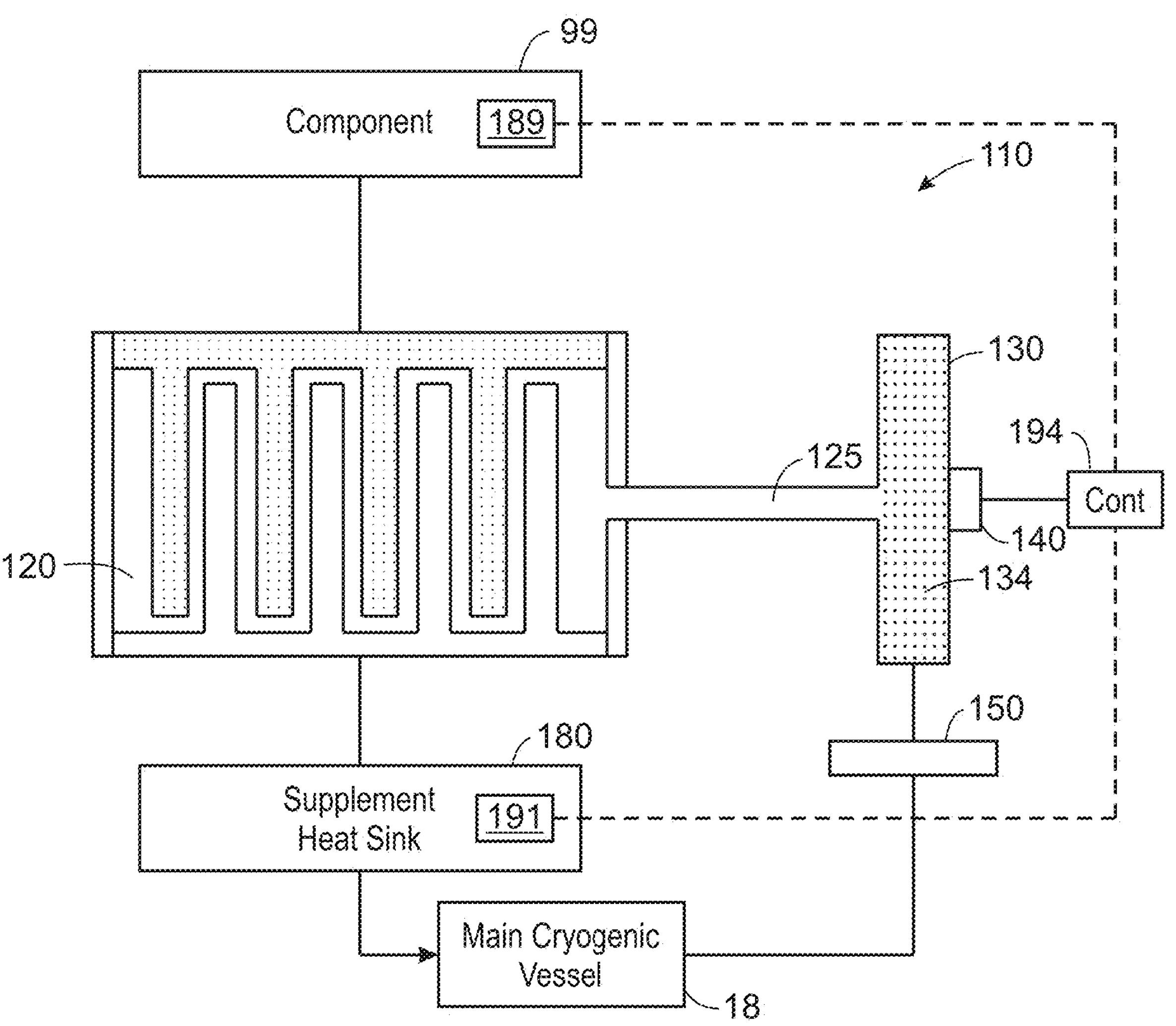
FIG. 5 is a schematic diagram of another embodiment of a supplemental cooling system with a gas gap heat switch, according to embodiments of the present disclosure.
Figure 6:
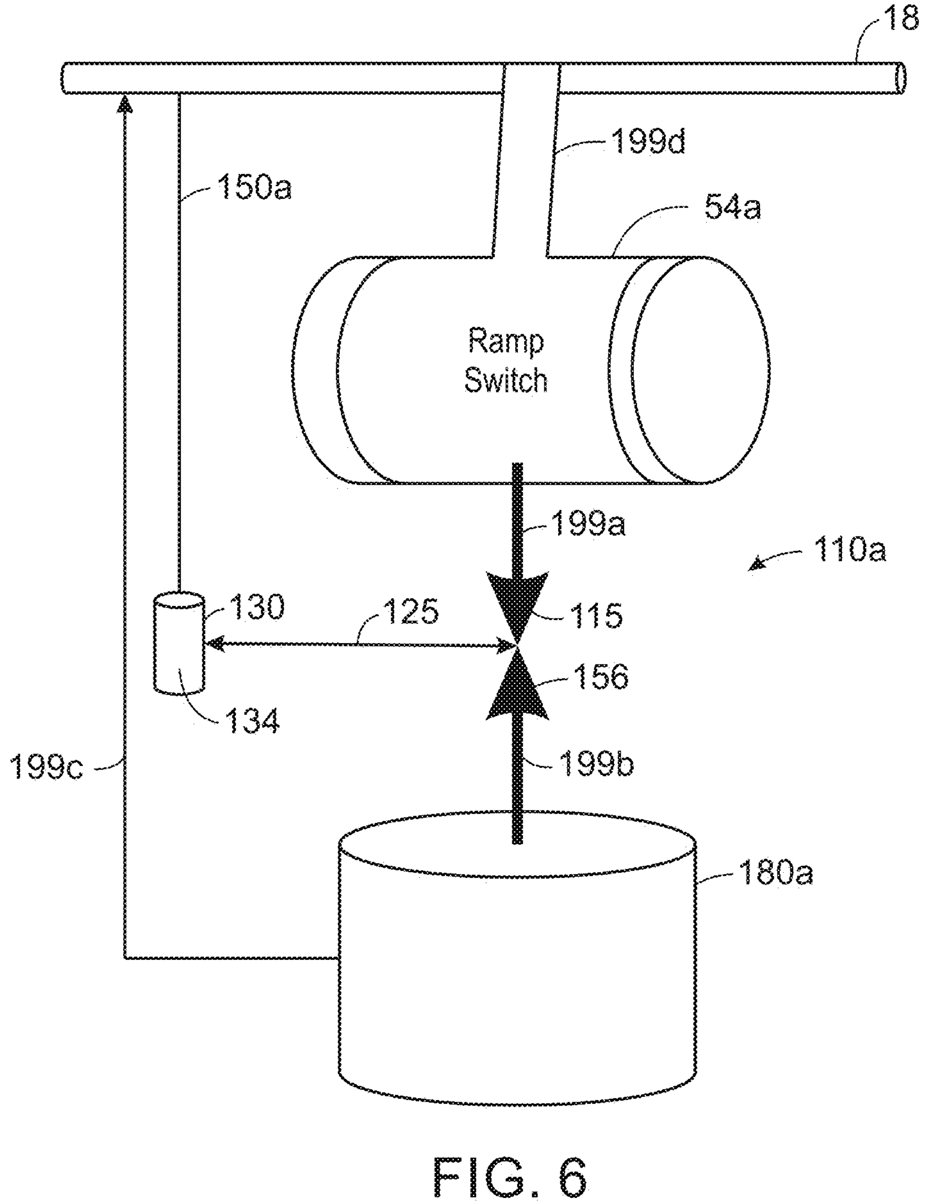
FIGS. 6-9 illustrate different embodiments of a supplemental cooling system configured to cool a gas gap heat switch according to the present disclosure.

A heater 140 is configured to heat the sorption pump 130 such that the sorption material 134 releases the gas into the gas gap 120 to "close" the switch. The heater 140 may be a heater device controlled to heat the sorption material to a predefined temperature. For example, the heater 140 may be an electric heater heated by running current through a resistor. In exemplary embodiments, the heater may be in the form of a wire made of nichrome, i.e. nickel and chromium alloy, or any other high resistance material wrapped around the sorption pump; or it may be in the form of a film heater that is attached to the surface, such as using a glue or some form of adhesive. Referring now to FIG. 5, an embodiment is shown wherein the heater 140 may be controlled by a controller 194, which is communicatively connected to the temperature sensor 189. The controller 194 may be, for example, a microcontroller configured to receive the sensed temperature and to control the heater 140 based on a temperature of the component 99 sensed by a temperature sensor 189. Thus, the controller 194 may be configured to turn on the heater 140 when the component reaches a predetermined "turn on" temperature, or a predetermined high threshold temperature. Depending on the configuration of the sorption pump 130, the controller 194 may be configured to turn off the heater 140 when the component 99 reaches a predetermined cooled, or low threshold, temperature. Alternatively, the controller 194 may be configured to operate the heater 140 for a calibrated amount of time to heat the sorption material 134. In still other embodiments, the heater 140 may be operated also based on input from a temperature sensor configured to sense a temperature of the sorption material 134, such as to heat the sorption material to a predetermined temperature and to maintain it at that temperature until such time as the gas gap heat switch 110 is to be opened to stop thermal conductivity by the gas gap heat switch 110.

In other embodiments, examples of which are illustrated below, the heater may be thermally connected to the component 99 or other heat source tied to the temperature of the component such that when the component heats up, the sorption material 134 is likewise heated so that the gas gap heat switch 110 closes to transfer the heat to the heat sink 180. In such an embodiment, the gas gap heat switch 110 may be configured to automatically open and/or close based on the temperature of the component 99 that is thermally connected to the sorption material 134, and thus temperature sensing of the component is unnecessary and no temperature sensing is conducted.

A cooler 150 is configured to cool the sorption pump 130 such that the sorption material 134 captures the gas and removes it from the gas gap 120 to "open" the switch. The cooler 150 may be, as exemplified in FIG. 5, a thermal connection to the main cryogen vessel 18, which for example may be liquid helium maintained at 4 K in the case of an MR system 10. In such an embodiment, the cooler 150 may be configured to cool the sorption material 134 to 4 K and maintain it at that temperature when the heater 140 is not operating. Alternatively, the cooler 150 may be connected to a cryocooler or other cold head.

FIGS. 6-10 exemplify various implementations, configurations of the supplemental cooling system 100, and control methods configured to cool a component, where the component is exemplarily a superconducting ramp switch 54*a* configured to act as the main ramp switch for ramping the superconducting magnet, such as an MRI magnet. In the embodiment shown in FIG. 6, the gas gap heat switch 110*a* includes a supplemental heat sink 180*a* being a cryogen tank, such as a liquid cryogen (hydrogen, neon, nitrogen, helium, etc.). Alternatively, the cryogen may initially be frozen, which may provide additional heat absorbing capacity and further reduce the quantity of cryogen needed to absorb the peak amount of heat generated by the main ramp superconducting switch 54*a*.

The gas gap heat switch 110*a* has a component side 115 thermally connected by thermal link 199*a* to the main ramp superconducting switch 54*a* and a heat sink side 156 thermally connected by thermal link 199*b* to the supplemental heat sink 180*a*. The supplemental heat sink 180*a* is connected by thermal link 199*c* to the main cryogen vessel 18, which is a narrower or more restrictive link than the thermal links 199*a* and 199*b*, and thus is configured to dissipate the heat slowly into the main cryogen circuit. The thermal link 199*d* between the superconducting ramp switch 54*a* and the main cryogen vessel 18 is also a restricted thermal transfer that transfers heat much more slowly than the thermal connections 199*a* and 199*b* through the gas gap heat switch 110*a*. For example, the thermal link 199*d* may be a narrow copper strap sized to transmit a predetermined small amount of heat. Thus, during ramping when the gas gap heat switch 110*a* is open and transferring heat, most of the heat generated during ramp due to current running through the switch is transferred to the heat sink 180*a* through the heat switch 110*a* because it has a much higher conductance than is possible through the thermal link 199*d*. For example, tens, or even hundreds, of watts may be transferred through the gas gap heat switch 110*a*, whereas the thermal link may be configured to only transfer a fraction of that amount of energy, such as less than 1 watt (e.g., 10 W transmitted through the gas gap heat switch 110*a* when it is transmitting heat while only 0.5 W is transmitted through the thermal link 199*d*).

Transmission through the gas gap heat switch 110*a* is controlled based on the temperature of the sorption material 134. The sorption pump 130 is connected to the main cryogenic vessel 18 through a thermal link 150*a* providing the cooler for the sorption material 134, which is thus continually cooled thereby. A heating mechanism is configured to add heat to the sorption material 134 when the gas gap heat switch 110*a* is to be opened, thus to add gas through the gas passageway 125 into the gas gap of the heat switch 110*a*. For example, the heating may be performed by a heater 140, such as controlled by a controller 194 based on a sensed temperature of the component (here the superconducting ramp switch 54*a*) (and in some embodiments also the temperature of the supplemental heat sink 180*a* and/or the temperature of the sorption material 134), as is described above with respect to FIG. 5.

Figure 7:
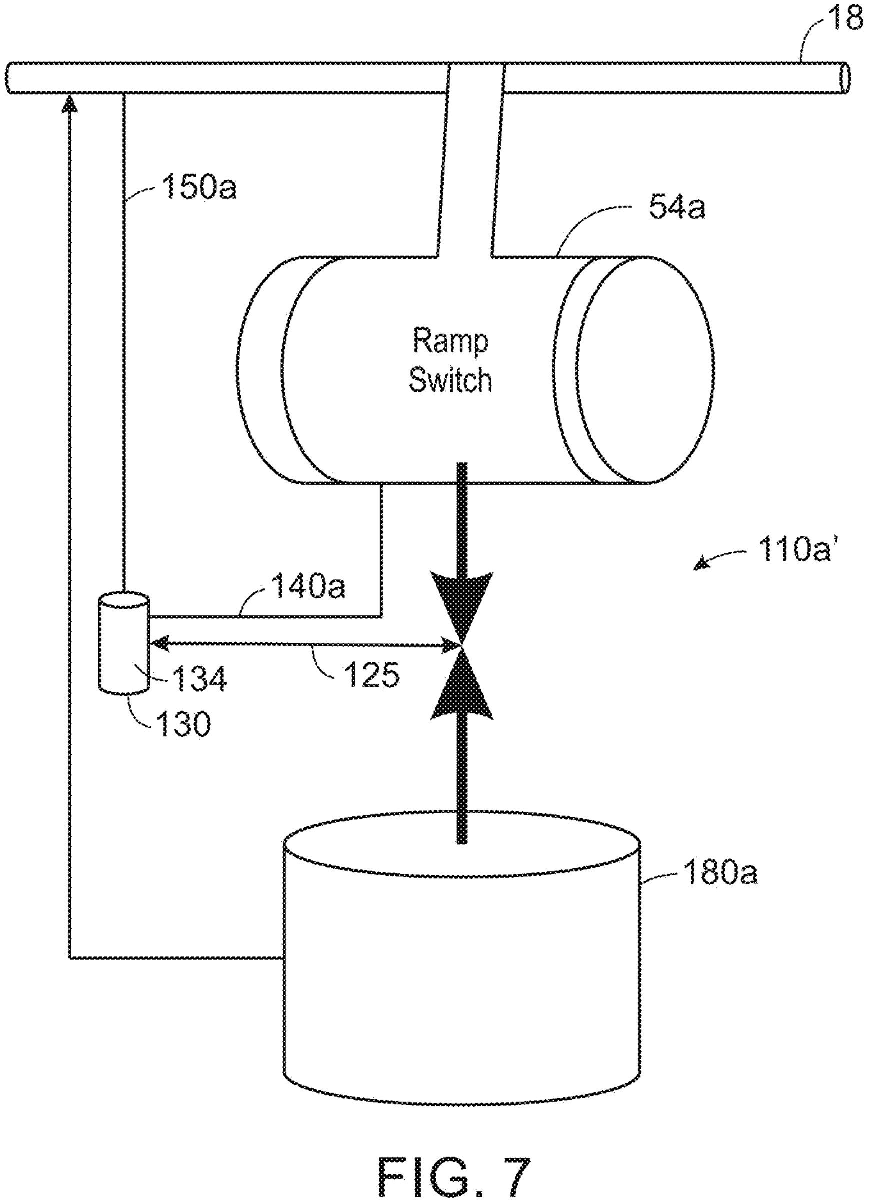

Alternatively, the heater may be a thermal connection to the component, which here is the superconducting ramp switch 54*a*. FIG. 7 illustrates such an embodiment, where the sorption pump 130 is heated by a thermal connection 140*a* to the superconducting ramp switch 54*a*. Thus, as the superconducting ramp switch 54*a* heats up, the sorption material 134 also heats up, thereby opening the gas gap heat switch 110*a*'. In such an embodiment, the gas gap heat switch 110*a*' is automatically heated when the component is heated, and the thermal link 140*a* may be designed such that no additional heating is necessary. For example, the thermal link 140*a* may be a copper connection, or wire, configured to transfer sufficient heat such that the gas gap heat switch 110*a*' opens when the superconducting ramp switch 54*a* reaches a predetermined temperature, such as 10 K, 15K, or some value closer to 25 K, or even higher perhaps in the 80K range (which may be the maximum designed temperature of the ramp switch 54*a*). In such an embodiment, no heat sensing or heater controller is needed because the gas gap heat switch 110*a*' is naturally and mechanically controlled via the thermal connections 140*a* and 150*a* and the activity of the ramp switch 54*a*.

Figure 8:
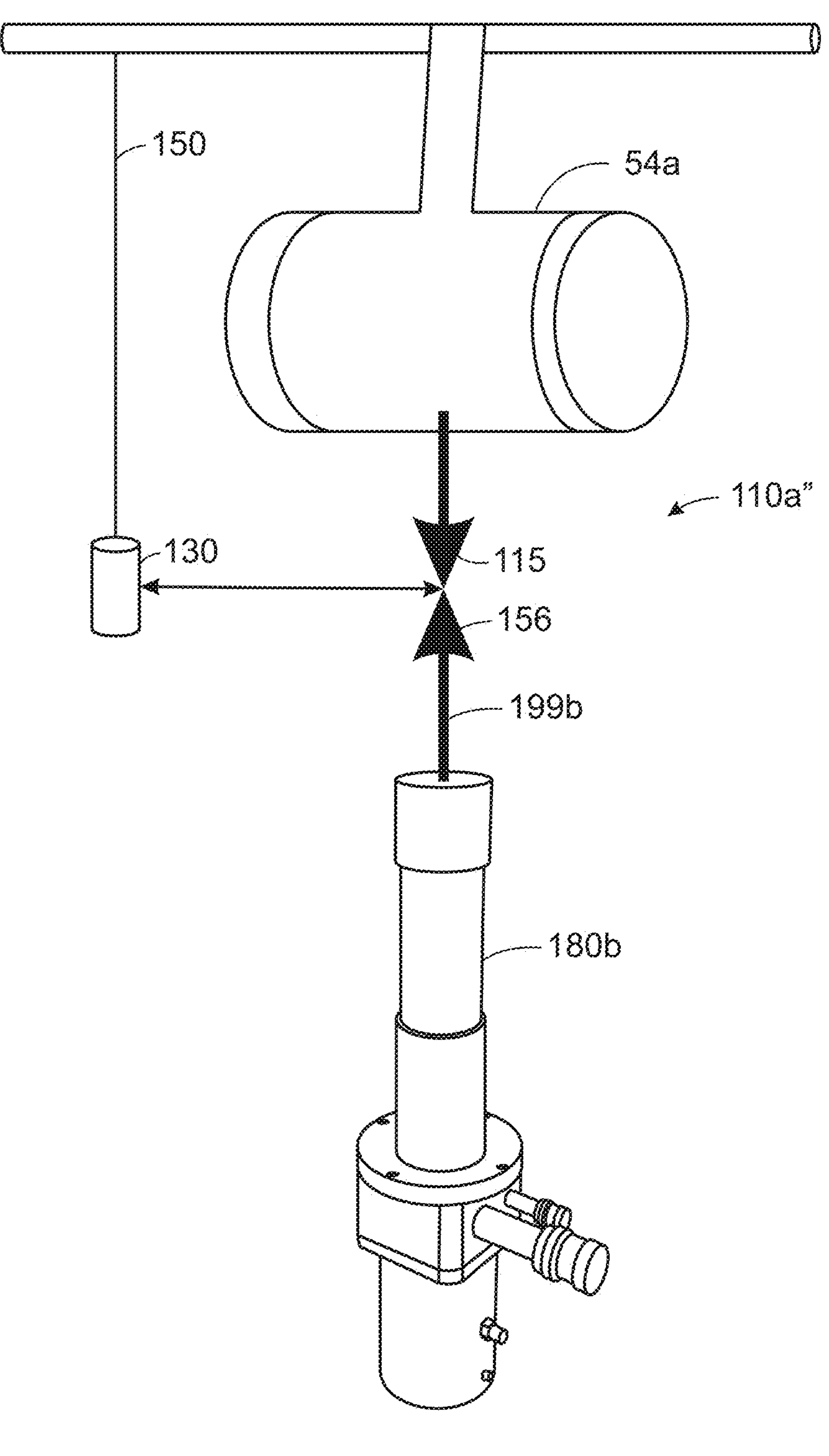

Accordingly, in the embodiments shown in FIGS. 7 and 8, the sorption material 134 is continually cooled via the cooler 150*a* being the thermal connection to the main cryogen circuit. Heat is then added to close the gas gap heat switch 110*a* and start thermal conduction. Once the heat is turned off or a significant heat amount is no longer being added to keep the sorption material 134 warm, then the sorption material 134 will cool back down to the temperature of the main cryogen, such as 4 K and the switch will be opened such that it is no longer thermally conductive.

Alternatively, in other embodiments, the sorption material 134 may be thermally linked to the component (here the superconducting ramp switch 54*a*) such that the gas gap heat switch 110 is closed when the component heats up and opens once the component is sufficiently cool. In such an embodiment, there may be only one thermal connection to the sorption pump, rather than a separate heater and cooler, where both the heating and the cooling come from the thermal connection to the component. One example of such an embodiment is shown and described with respect to FIG. 11.

FIG. 8 depicts another embodiment of the gas gap heat switch 110*a*" configured to cool the superconducting ramp switch 54*a*, where in the depicted embodiment the supplemental heat sink 180*b* is a cryocooler. For example, the supplemental heat sink 180*b* may be a single stage cryocooler. In one implementation, the cryocooler 180*b* may be contained in a secondary vacuum jacket that allows installing and removing the cryocooler without breaking the main vacuum of the vacuum vessel 19 (see FIGS. 2-3) and without disturbing the magnet operation. In still other embodiments, the supplemental heat sink may be a solid, such as a thermal connection to some portion of the thermal shield assembly 16 (see FIG. 2).

Figure 9:
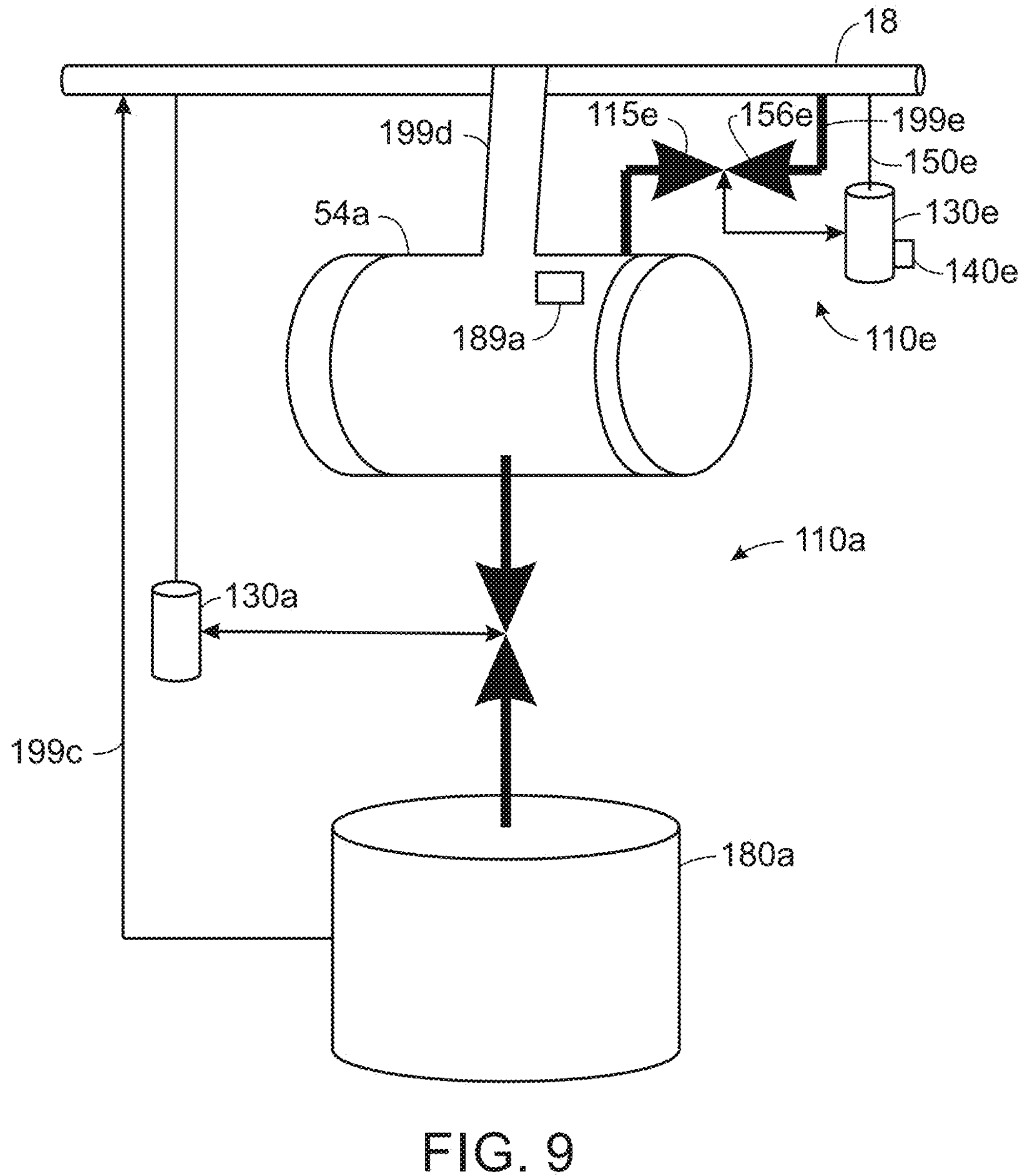

FIG. 9 illustrates another implementation where a second gas gap heat switch 110*e* is added. Thus, two gas gap heat switches 110*a* and 110*e* are connected to the component, such as the superconducting ramp switch 54*a* to speed up the cooldown process. In some embodiments, the two gas gap heat switches 110*a* and 110*e* may be configured to open, or conduct heat, at different temperatures and thus to handle different thermal sections of the cooldown process. The first gas gap heat switch 110*a* is configured to thermally connect and disconnect the superconducting ramp switch 54*a* to the supplemental heat sink 180*a*, and may have any of the various configurations described above such as with respect to FIGS. 6 through 8. The first sorption pump 130*a* may be heated by an active heater 140 controlled by a controller 194 in response to sensed temperature(s), such as shown and described in FIG. 5. Alternatively, the first sorption pump 130*a* may be passively controlled and heated via a thermal connection to the superconducting ramp switch 54*a*, as is shown in FIG. 7.

A second gas gap heat switch 110*e* connects the superconducting ramp switch 54*a* to a second heat sink, which may the main cryogenic vessel 18 as is shown in FIG. 9 or may be a second supplemental heat sink (not shown). The second gas gap heat switch 110*e* has a component side 115*e* thermally connected to the component 54*a* and a heat sink side 156*e* connected to the heat sink, which here is the main cryogenic vessel 18. The sorption pump 130*e* is configured to close and open the second heat switch 110*e* as the sorption material therein is heated and cooled, respectively. The sorption material in the sorption pump 130*e* may be, for example, charcoal or may be other material as is described above. The sorption pump 130*e* is cooled by the cooler 150*e* being a thermal link to the main cryogen. The sorption pump 130*e* is heated by heater 140*e*. The heater 140*e* may be an active heater controlled by a controller (not shown) based on a sensed temperature of the component, e.g., by the temperature sensor 189*a* configured to sense the temperature of the superconducting ramp switch 54*a*.

Figure 10:
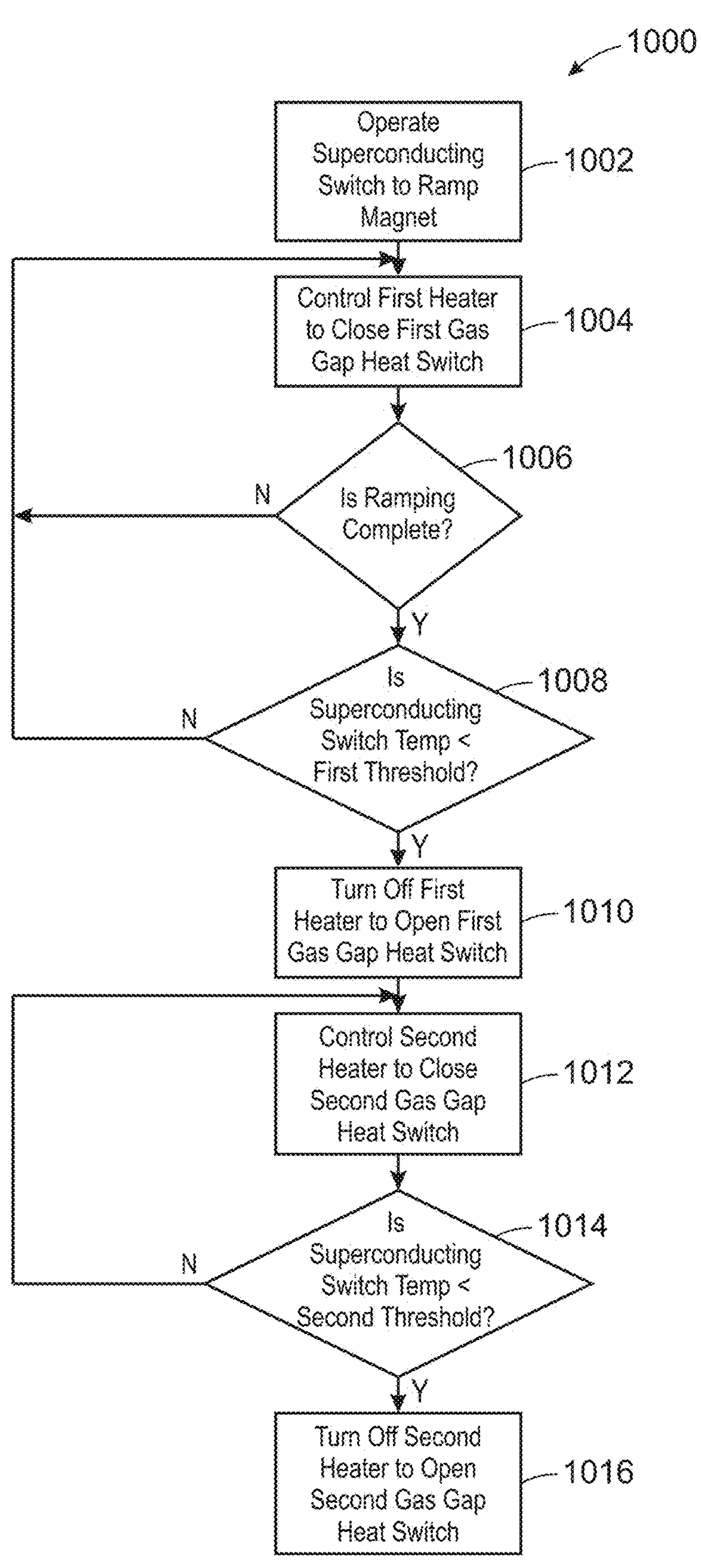
FIG. 10 is a flow diagram illustrating one embodiment of a method of controlling a supplemental cooling system of the present disclosure, wherein the supplemental cooling system includes two gas gap heat switches.

The first gas gap heat switch 110*a* and the second gas gap heat switch 110*e* may be configured to open and close at different temperatures, and thus at different times in the cooling process of cooling the superconducting ramp switch 54*a*. FIG. 10 shows one embodiment of a cooldown process and method 1000 for controlling cooling of a component wherein the supplemental cooling system comprises two gas gap heat switches attached to the component and configured to facilitate cooling, which is explained with reference to the embodiment in FIG. 9. The superconducting ramp switch 54*a* is operated to ramp up the magnet at step 1022. For example, all components may be completely cooled to a starting temp equal to the temperature of the main cryogenic vessel, such as 4 K. The superconducting ramp switch 54*a* will quickly begin to heat up. The first heater (not shown) of the first gas gap heat switch 110*a* is operated to heat the sorption pump 130*a* to close the first gas gap heat switch 110*a* at step 1004. For example, the heater may be actively controlled by a controller or may be a passive heater being a thermal connection to the ramp switch 54*a*. The first gas gap heat switch 110*a* remains closed (i.e., the heater continues to heat the sorption material of the first heat switch 110*a*) and thus conducts heat to the supplemental heat sink 180*a* until after the ramping is complete at step 1006 and until after the ramp switch 54*a* is cooled to a first threshold temperature at step 1008. For example, where the starting cold temperature before ramping is 4 K, the first threshold temperature may be 20 K.

Once the ramp switch 54*a* is less than the first temperature, the first gas gap heat switch 110*a* is turned off at step 1010, for example by turning off the first heater. The second gas gap heat switch 110*e* is closed, or turned on, at step 1012 by controlling the second heater 140*e* to heat the sorption pump 130*e*. The second gas gap heat switch 110*e* remains closed, such as by continuing to heat the sorption pump 130*e*, until the ramp switch 54*a* reaches a second threshold temperature at step 1014. For example, where the starting cold temperature before ramping is 4 K and the first temperature threshold is 20 K, the second temperature threshold may be 6 K. Once the second temperature threshold is reached, the second heater 140*e* is turned off at step 1016, thus opening the second gas gap heat switch 110*e* such that it no longer transfers heat. The ramp switch 54*a* will continue to cool down slowly via heat transfer to the main cryogenic vessel 18 via the thermal link 199*d*, which is a narrow (or "weak") thermal link as described above. The supplemental heat sink 180*a* will also slowly dissipate heat to the main cryogenic vessel 18 via the thermal link 199*c* until it is cooled to the same temperature as the main cryogen or until ramping begins again, whatever occurs first. The thermal links 199*c* and 199*d* are configured to be sufficiently narrow, or "weak", such that too much heat is not transferred to the main cryogen at any given time so as not to overload the main cooling circuit.

Figure 11:
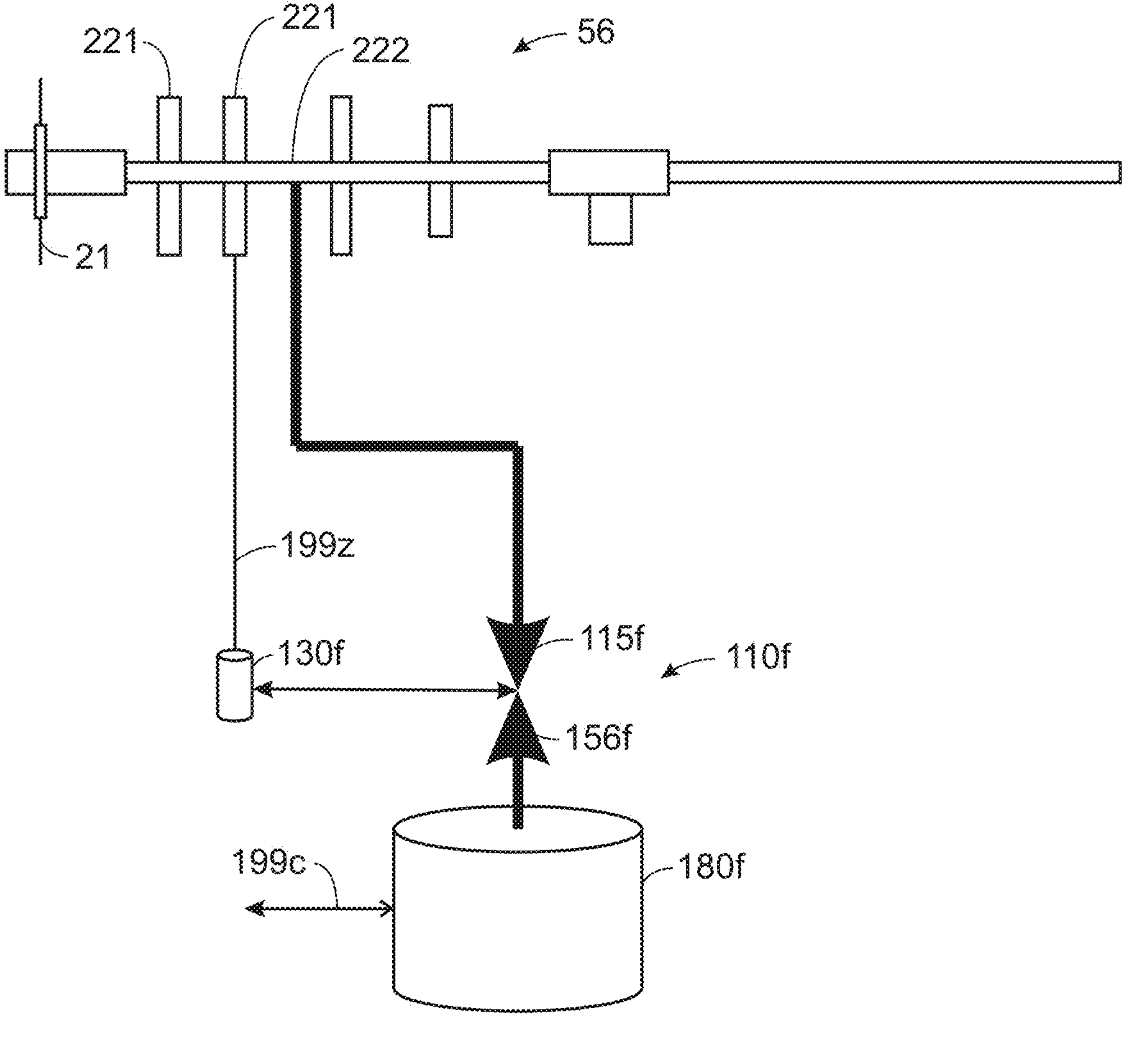
FIG. 11 is a schematic diagram showing an embodiment of a supplemental cooling system configured to cool a fixed ramp lead assembly.

FIG. 11 shows an embodiment where a gas gap heat switch 110*f* is configured to alternately connect and disconnect the power ramp lead 52, which here is a fixed ramp lead assembly 56. As is described above, a fixed ramp lead assembly 56 may be positioned within the vacuum vessel wall 21 (thus, inside the vacuum vessel) and used to energize a magnet (e.g. magnet 14 described in FIGS. 1 and 2 above). The temperature of conductive discs 221 increase during the energizing and need to be cooled. The fixed ramp lead assembly 56 comprises a series of conductive discs 221, such as comprised of highly conductive copper, separated by a separator 222 having lower thermal conductive material such as brass. A gas gap heat switch 110*f* is configured to close during the energizing process to transfer heat from the fixed ramp lead assembly 55 to the heat sink 180*f* to cool the fixed ramp lead assembly 56. The component end 115*f* of the gas gap heat switch is thermally connected to a portion of the fixed ramp lead assembly 56, such as to the separator 222. The heat sink side 156*f* of the heat switch 110*f* is thermally connected to the supplemental heat sink 180*f*, such as a supplemental cryogen tank or a cryocooler. Alternatively, the supplemental heat sink 180*f* may be the thermal shield assembly 16 (see FIGS. 2-3). The supplemental heat sink 180*f* is configured to slowly transfer heat to another, likely larger, heat sink through the thermal link 199*c*, such as to the cold head configured to cool the main cryogenic vessel.

In the depicted embodiment, the temperature of the sorption pump, and thus the opening and closing operation of the heat switch 110*f* may be passively controlled via a thermal link 199*z* linking the temperature of the sorption material in the sorption pump 130*f* to the temperature of a portion of the component, which here is the conductive discs 221 of the fixed ramp lead assembly 56. Thus, as the conductive discs 221 of the fixed ramp lead assembly 56 are heated, the gas gap heat switch 110*f* closes to enable heat transfer to the supplemental heat sink 180*g*. Once the conductive discs 221 of the fixed ramp lead assembly 56 has cooled, the sorption pump 130*f* will also cool which will open the gas gap heat switch 110*f* such that no further substantial heat transfer occurs between the supplemental heat sink 180*f* and the fixed ramp lead assembly 56. FIG. 11 exemplifies this thermal control arrangement with respect to the fixed ramp lead assembly 56. A similar arrangement may be utilized with the superconducting switch 54 or other component.

Alternatively, sorption pump **130*f* may be connected to a separate cooler and may be heated via connection to the fixed ramp lead assembly. In still other embodiments, the temperature of the sorption pump 130*f* may be actively heated by a heater controlled based on a sensed temperature of the fixed ramp lead assembly 56**.

In some embodiments, any suitable computer readable media can be used for storing instructions for performing functions and/or processes described herein, such as instructions executed by a controller. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

This written description uses examples to disclose the invention(s), including the best mode, and also to enable any person skilled in the art to make and use the invention(s). Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention(s) is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A superconducting electrical system, comprising:

a superconducting electrical machine comprising a superconducting magnet;

a main cryogenic vessel containing a main cryogen and encompassing the superconducting magnet;

a vacuum vessel encompassing the main cryogenic vessel;

a supplemental cooling system inside the vacuum vessel and comprising:

a supplemental heat sink;

a gas gap heat switch configured to alternately thermally connect the supplemental heat sink to a component of the superconducting electrical machine and thermally isolate the supplemental heat sink from the component of the superconducting electrical machine; and wherein the supplemental cooling system is configured to supplement cooling of the superconducting electrical machine by the main cryogenic vessel to expedite cooling of the component of the superconducting electrical machine.

2. The system of claim 1, wherein the supplemental heat sink is a cryogen tank comprising a second cryogen.

3. The system of claim 2, wherein the cryogen tank is thermally connected to the main cryogenic vessel so as to dissipate heat thereto.

4. The system of claim 2, wherein the second cryogen is different than the main cryogen.

5. The system of claim 2, wherein the main cryogen and the second cryogen each contain at least one of helium, hydrogen, neon, or nitrogen.

6. The system of claim 1, wherein supplemental heat sink is a cryocooler.

7. The system of claim 1, wherein supplemental heat sink is at least a portion of a thermal shield surrounding the superconducting magnet.

8. The system of claim 1, wherein the superconducting electrical machine is a magnet system for a magnetic resonance imaging machine or a power generator, and wherein the component of the superconducting electrical machine includes at least one of a superconducting switch and a power ramp lead.

9. A magnetic resonance imaging system, comprising:

a superconducting electrical machine comprising a superconducting magnet;

a main cryogenic vessel containing a main cryogen and encompassing the superconducting magnet, containing a cryogen and configured to cool the superconducting magnet;

a vacuum vessel encompassing the main cryogenic vessel;

a supplemental cooling system inside the vacuum vessel and comprising:

a supplemental heat sink a gas gap heat switch configured to alternately thermally connect the supplemental heat sink to a component of the superconducting electrical machine and thermally isolate the supplemental heat sink from the component of the superconducting electrical machine;

wherein the supplemental cooling system is configured to supplement cooling of the component of the superconducting electrical machine by the cryogenic vessel to expedite cooling of the component of the superconducting electrical machine.

10. The system of claim 9, wherein the supplemental heat sink is a cryogen tank comprising a second cryogen.

11. The system of claim 10, wherein the cryogen tank is thermally connected to the main cryogenic vessel so as to dissipate heat thereto.

12. The system of claim 10, wherein the second cryogen is different than the main cryogen.

13. The system of claim 10, wherein the main cryogen and the second cryogen each contain at least one of helium, hydrogen, neon, or nitrogen.

14. The system of claim 9, wherein supplemental heat sink is a cryocooler.

15. The system of claim 9, wherein supplemental heat sink is at least a portion of a thermal shield surrounding the superconducting magnet.

16. The system of claim 9, wherein the supplemental cooling system includes at least a first gas gap heat switch configured to thermally connect the supplemental heat sink to the component and a second gas gap heat switch configured to connect the component to a different heat sink than the supplemental heat sink.

17. The system of claim 9, wherein the superconducting electrical machine includes a superconducting switch coupled to the superconducting electrical machine and configured to switch between a resistive mode and a superconducting mode;

wherein the gas gap heat switch is configured to thermally connect the supplemental heat sink to the superconducting switch when the superconducting switch is in the resistive mode and thermally isolate the supplemental heat sink from the superconducting switch when the superconducting switch is in the superconducting mode.

18. The system of claim 9, wherein the superconducting electrical machine includes a power ramp lead disposed within the vacuum vessel and having a first end and a second end, wherein the first end of the power ramp lead is coupled in a fixed manner to a vacuum vessel wall of the vacuum vessel and the second end is directly or indirectly to coupled to a superconducting switch; and wherein the gas gap heat switch is configured to thermally connect the supplemental heat sink to the power ramp lead when the superconducting switch is in a resistive mode and thermally isolate the supplemental heat sink from the power ramp lead when the superconducting switch is in a superconducting mode.

19. A method of controlling a supplemental cooling system for a superconducting electrical system, the method comprising:

controlling a first gas gap heat switch connected to a component of the superconducting electrical system to thermally connect the component to a supplemental heat sink;

after a temperature of the component is less than a first threshold temperature, controlling the first gas gap heat switch to thermally isolate the component from the supplemental heat sink; and slowly dissipating heat from the supplemental heat sink to a main heat sink over a period of time while the first gas gap heat switch is thermally isolating the component from the supplemental heat sink.

20. The method of claim 19, further comprising:

after the component is cooled to a second threshold temperature via the supplemental heat sink, controlling a second gas gap heat switch connected to the component of the superconducting electrical system to thermally connect the component to a different heat sink than the supplemental heat sink;

after the temperature of the component is less than a third threshold temperature, controlling the second gas gap heat switch to thermally isolate the component from the different heat sink; and wherein the third threshold temperature is lower than the first threshold temperature and the second threshold temperature.

* * * * *